United States Patent
Nakajima

(10) Patent No.: US 10,836,216 B2
(45) Date of Patent: Nov. 17, 2020

(54) TIRE

(71) Applicant: Sumitomo Rubber Industries, Ltd., Kobe (JP)

(72) Inventor: Sho Nakajima, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 360 days.

(21) Appl. No.: 15/883,308

(22) Filed: Jan. 30, 2018

(65) Prior Publication Data
US 2018/0236819 A1    Aug. 23, 2018

(30) Foreign Application Priority Data

Feb. 21, 2017 (JP) .................. 2017-030314

(51) Int. Cl.
*B60C 11/11* (2006.01)
*B60C 11/03* (2006.01)
*B60C 11/12* (2006.01)

(52) U.S. Cl.
CPC ........ *B60C 11/0309* (2013.01); *B60C 11/032* (2013.01); *B60C 11/0306* (2013.01); *B60C 11/0332* (2013.01); *B60C 2011/0348* (2013.01); *B60C 2011/0353* (2013.01); *B60C 2011/0355* (2013.01); *B60C 2011/0365* (2013.01); *B60C 2011/0367* (2013.01); *B60C 2011/0372* (2013.01); *B60C 2011/0381* (2013.01); *B60C 2011/1213* (2013.01)

(58) Field of Classification Search
CPC ......... B60C 11/11; B60C 11/12; B60C 11/13; B60C 11/032; B60C 2011/0341; B60C 11/0306; B60C 11/0309; B60C 11/0311
See application file for complete search history.

(56) References Cited

U.S. PATENT DOCUMENTS

2009/0277550 A1* 11/2009 Ikeda
2018/0333991 A1* 11/2018 Oda .................... B60C 11/1236

FOREIGN PATENT DOCUMENTS

| JP | 2011105074 A | * | 6/2011 | |
| JP | 2015-13514 A | | 1/2015 | |
| JP | 2015013514 A | * | 1/2015 | |
| WO | WO-2015098408 A1 | * | 7/2015 | B60C 11/0304 |

* cited by examiner

*Primary Examiner* — Steven D Maki
*Assistant Examiner* — Cedrick S Williams
(74) *Attorney, Agent, or Firm* — Birch, Stewart, Kolasch & Birch, LLP

(57) ABSTRACT

A tire includes a tread portion being provided with a shoulder main groove and a crown main groove to form a middle land portion therebetween. The middle land portion is divided into a plurality of middle blocks. At least one of the middle blocks is provided with a recess to form a first portion located on a circumferential first side of the recess and a second portion located on a circumferential second side of the recess, wherein at a side of the shoulder main groove, the second portion has a circumferential edge smaller than that of the first portion. The second portion includes a ground contacting surface provided with a dimple. The dimple is located on a side of the shoulder main groove with respect to the center in the tire axial direction of the middle land portion.

8 Claims, 4 Drawing Sheets

TIRE

BACKGROUND ART

Field of the Invention

The present disclosure relates to tires, and more particularly to a tire capable of improving driving performance on snow road condition while maintaining steering stability on dry road condition.

Description of the Related Art

Recent years, in winter pneumatic tires, an opportunity of traveling not only snow and ice road conditions but also dry road condition has been increased, for example. In view of the above circumstances, it has been requested for winter pneumatic tires to improve steering stability on dry road condition in addition to improved driving performance on snow road condition.

For example, in order to improve driving performance on snow road condition, a tire tread having greater width and depth grooves for generating large snow traction has been proposed. Unfortunately, the above tire tread tends to have low pattern rigidity as well as a small ground contacting area, leading to deteriorated steering stability on dry road condition.

As a related art, Japanese Unexamined Patent Application Publication 2015-13514 may be referenced.

SUMMARY OF THE INVENTION

The present disclosure has been made in view of the above circumstances and has an object to provide tires capable of improving driving performance on snow road condition while maintaining steering stability on dry road condition.

In one aspect of the disclosure, a tire includes a tread portion being provided with a shoulder main groove extending continuously in a tire circumferential direction on a side of a tread edge and a crown main groove extending continuously in the tire circumferential direction and arranged inwardly in a tire axial direction of the shoulder main groove to form a middle land portion between the shoulder main groove and the crown main groove.

The middle land portion is divided into a plurality of middle blocks by a plurality of middle lateral grooves connecting the shoulder main groove with the crown main groove. At least one of the plurality of middle blocks is provided with a recess extending inwardly in the tire axial direction from the shoulder main groove and terminated within the at least one of the middle blocks so as to form a first portion located on a first side in the tire circumferential direction of the recess and a second portion located on a second side in the tire circumferential direction of the recess, wherein at a side of the shoulder main groove, the second portion has a circumferential edge smaller than that of the first portion.

The second portion includes a ground contacting surface provided with at least one dimple. The at least one dimple is located on a side of the shoulder main groove with respect to the center in the tire axial direction of the middle land portion.

In another aspect of the present disclosure, the tread portion may further include a shoulder land portion disposed between the shoulder main groove and the tread edge.

The shoulder land portion may be provided with at least one shoulder lateral groove extending from the shoulder main groove to the tread edge.

The at least one shoulder lateral groove may be arranged so as to be continuous smoothly to at least one recess in such a manner as to form a single groove across the shoulder main groove.

In another aspect of the present disclosure, the plurality of middle lateral grooves may be configured as a V-shaped manner having an apex protruding toward the first side in the tire circumferential direction.

In another aspect of the present disclosure, the ground contacting surface of the second portion may include a lateral edge on an opposite side in the tire circumferential direction to the recess.

The lateral edge may intersect the circumferential edge of the second portion at an acute angle.

In another aspect of the present disclosure, the recess may be inclined toward the first side in the tire circumferential direction from the shoulder main groove.

In another aspect of the present disclosure, at least one of the plurality of middle blocks may be provided with a narrow groove extending in the tire circumferential direction and having a width and a depth which are smaller than those of the shoulder main groove. The narrow groove may be in communication with at least one of the plurality of middle lateral grooves at a position located inwardly in the tire axial direction of the apex of the at least one of the plurality of middle lateral grooves.

DESCRIPTION OF THE PREFERRED EMBODIMENTS

An embodiment of the present disclosure will be explained below with reference to the accompanying drawings.

Figure 1:
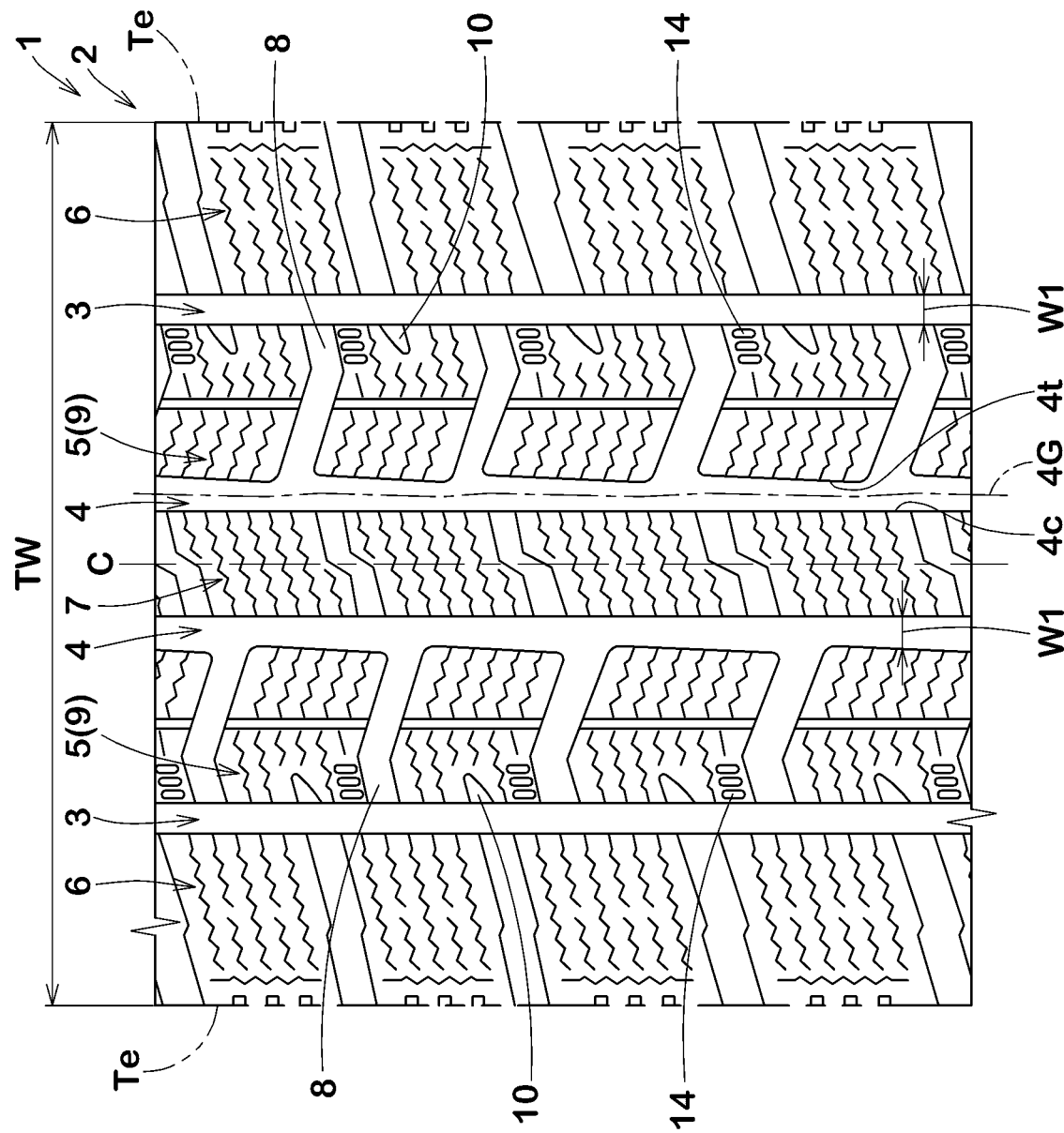
FIG. 1 is a development view of a tread portion of a tire according to an embodiment of the present disclosure.

FIG. 1 illustrates a development view of a tread portion 2 of a tire 1 according to an embodiment of the present disclosure. In some preferred embodiments, the tire 1 is embodied as a pneumatic tire for passenger car, for example. Note that the tire in accordance with the present disclosure may be embodied as various kinds of tires, e.g., for heavy duty vehicle, motorcycle and the like, for example.

As illustrated in FIG. 1, the tread portion 2 is provided with a shoulder main groove 3 and a crown main groove 4 on each side of the tire equator C, for example. The shoulder main groove 3 extends continuously in the tire circumferential direction on the side of a tread edge Te. The crown main groove 4 extends continuously in the tire circumferential direction and arranged inwardly in the tire axial direction of the shoulder main groove 3. Thus, one shoulder main groove 3 and one crown main groove 4 are arranged between the tire equator C and the respective each tread edge Te.

In this embodiment, the shoulder main groove 3 extends in a straight manner in parallel with the tire circumferential direction. The shoulder main groove 3 as such may be useful to maintain in rigidity of both land portions which disposed adjacently to the shoulder main groove 3 in the tire axial direction as well as to improve steering stability on dry road condition by suppressing unstable motions of a vehicle such as unstable state upon braking and undesirable traveling that causes the vehicle to pull to one side. Alternatively, the shoulder main groove 3 may extend in a wavy or zigzag manner, for example.

In this embodiment, the crown main groove 4 is configured such that a groove centerline 4G thereof extends in a zigzag manner. The crown main groove 4 has an inner groove edge 4c on the side of the tire equator C extending in a straight manner in parallel with the tire circumferential direction and an outer groove edge 4t on the side of the tread edge Te extending in a zigzag manner in the tire circumferential direction. The crown main groove 4 as such includes groove edge components in the tire axial direction, leading to driving performance on snow road condition.

In order to improve steering stability and driving performance on snow road condition in a good balanced manner, widths W1 in the tire axial direction of the shoulder main groove 3 and the crown main groove 4, for example, may preferably be in a range of from 2% to 7% of the tread width TW. Further, depths of the shoulder main groove 3 and the crown main groove 4, for example, may be in a range of from 7.5 to 10.0 mm.

As used herein, the tread width TW is defined as an axial distance between the tread edges Te under a standard condition. The standard condition is such that the tire 1 is mounted on a standard wheel rim with a standard pressure, but is loaded with no tire load. As used herein, the tread edges Te refer to axially outermost edges of the ground contacting patch of the tread portion 2 which occurs under the standard condition with a standard tire load when the camber angle of the tire is set to zero. In this application including specification and claims, various dimensions, positions and the like of the tire 1 refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tire, however, the standard pressure is defined uniformly as 180 kPa.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like. In case of passenger car tire, however, the standard tire load is defined as an 88% of the above load.

In this embodiment, the tread portion 2 includes a middle land portion 5, a shoulder land portion 6 and a crown land portion 7. The middle land portion 5, on each side of the tire equator C, is disposed between the shoulder main groove 3 and the crown main groove 4. The shoulder land portion 6, on each side of the tire equator C, is disposed between the shoulder main groove 3 and the tread edge Te. The crown land portion 7 is disposed between the pair of crown main grooves 4.

The middle land portion 5 is provided with a plurality of middle lateral grooves 8 which connects the shoulder main groove 3 with the crown main groove 4. The middle lateral grooves 8 may generate snow-shearing force to increase traction and braking force on snow road condition.

The middle land portion 5 is divided into a plurality of middle blocks 9 by the shoulder main groove 3, the crown main groove 4 and the middle lateral grooves 8.

Figure 2:
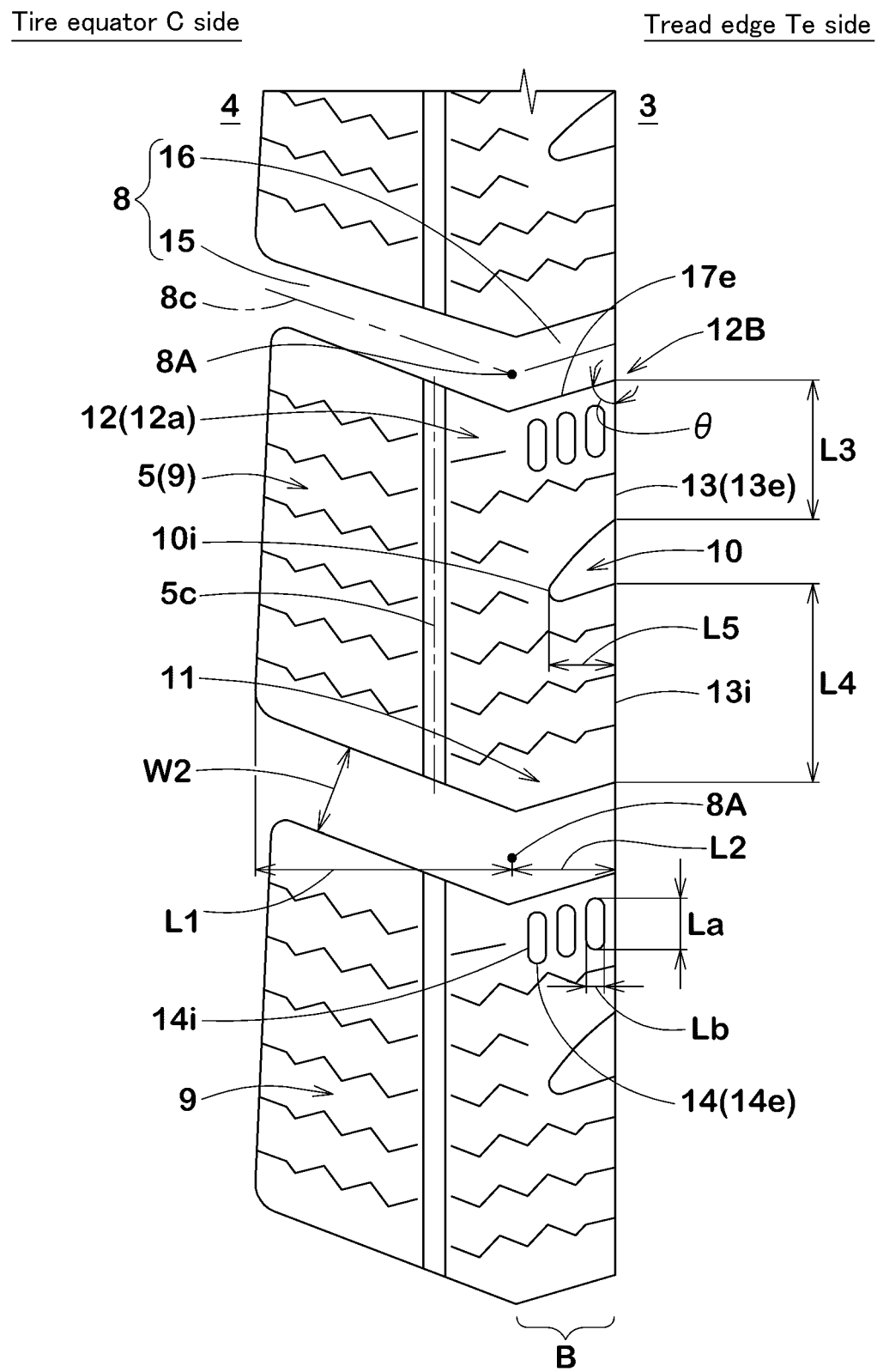
FIGS. 2 and 3 are enlarged views each illustrating a middle land portion of FIG. 1.

FIG. 2 illustrates an enlarged view of the right side of the middle land portion 5 of FIG. 1. As illustrated in FIG. 2, at least one of the middle blocks 9 is provided with a recess 10 which extends inwardly in the tire axial direction from the shoulder main groove 3, and which terminates within the middle block 9. The recess 10 as such may generate snow-shearing force while suppressing reduction in pattern rigidity of the middle block 9. In this embodiment, each of the middle blocks 9 is provided with one recess 10.

By being provided with recess 10, the middle block 9 is configured to include a first portion 11 located on a first side (e.g. below in Figure) in the tire circumferential direction of the recess 10 and a second portion 12 located on a second side (e.g. above in Figure) in the tire circumferential direction of the recess 10. Further, at a side of the shoulder main groove 3, the second portion 12 has a circumferential edge 13 in the tire circumferential direction smaller than that of the first portion 11. Since rigidity in the tire circumferential direction of the first portion 11 and the second portion 12 becomes imbalance, the second portion 12 of the middle block 9 on the side of the shoulder main groove 3 tends to deform flexibly upon grounding. Thus, recess 10 and the middle lateral groove 8 being adjacent to the second portion 12 tend to hold snow easily as well as release it easily such that these recess 10 and the middle lateral groove 8 are not clogged up by the snow. Consequently, driving performance on snow road condition of the tire can be improved.

The second portion 12 includes a ground contacting surface 12a which is provided with at least one dimple 14 located on the side of the shoulder main groove 3 with respect to the center 5c in the tire axial direction of the middle land portion 5, and therefore the second portion 12 on the side of the shoulder main groove 3 tends to deform flexibly upon grounding. Further, the dimple 14 may generate snow-shearing force to further improve driving performance on snow road condition. On the other hand, since the first portion 11 may have relatively higher pattern rigidity than that of the second portion 12, deterioration in steering stability may be suppressed. Consequently, the tire 1 in accordance with the present disclosure can improve driving performance on snow road condition while maintaining better steering stability.

In general, the ground contact pressure acting on the tread portion 2 when straight traveling ahead tends to be relatively low on the shoulder regions as compared with the crown region. Deformation of an outer portion of the middle blocks 9 in the tire axial direction tends to be smaller than that of an inner portion thereof in the tire axial direction. On the other hand, since an outer portion of the middle land portion 5 in the tire axial direction is provided with the recess 10 and the dimple 14, deformation of the outer portion of the middle blocks 9 in the tire axial direction tends to be promoted, and thus snow in the middle lateral groove 8 may be released smoothly.

The dimple 14, in this embodiment, has an edge 14e which closes within the ground contacting surface 12a of the second portion 12. The dimple 14 as such may suppress reduction in pattern rigidity of the middle blocks 9, leading to maintain better steering stability.

The dimple 14, in this embodiment, is configured as an elliptic shape. The elliptic shape of the dimple 14, in this embodiment, has the major axis extending along the tire circumferential direction, preferably extending in parallel with the tire circumferential direction. The dimple 14 as such may suppress reduction in pattern rigidity of the middle block 9. Alternatively, the dimple 14 may be configured as a polygonal or circular shape.

In this embodiment, a plurality of dimples 14 is provided on one middle block 9 so as to be arranged in the tire axial direction. This configuration may expand a region of the middle block 9 which tends to deform flexibly in the tire axial direction, thereby releasing snow in the middle lateral groove 8 smoothly. Alternatively, one dimple 14 may be provided on one middle block 9.

In order to improve driving performance on snow road condition and steering stability in a good balanced manner, a length La of the dimple 14 in the major axis direction may be in a range of from 3.0 to 4.5 mm, and a length Lb of the dimple 14 in the minor axis direction of dimple 14 may be in a range of from 1.0 to 2.5 mm. Further, the depth of dimple 14 may be in a range of from 0.5 to 3.0 mm.

In this embodiment, the middle lateral grooves 8 each are configured as a V-shaped manner having an apex 8A protruding toward the first side in the tire circumferential direction. The middle lateral grooves 8 may generate large snow-shearing. As used herein, the "apex" is defined using the groove centerline 8c.

The middle lateral grooves 8 each include an inner portion 15 and an outer portion 16. Each inner portion 15 extends from the apex 8A toward the tire equator C with an inclination with respect to the tire axial direction. The outer portion 16 extends outwardly in the tire axial direction from the apex 8A with an inclination with respect to the tire axial direction in an opposite direction to the inner portion 15.

Preferably, a length L1 in the tire axial direction of the inner portion 15 may be longer than a length L2 in the tire axial direction of the outer portion 16. As described above, in the tread portion 2, a crown region tends to receive larger ground contact pressure than shoulder regions upon traveling. Thus, since the apex 8A is located outside in the tire axial direction, wear to be generated on a portion around the apex 8A of the middle block 9 may be reduced, thereby maintaining better steering stability. In view of the above, the length L1 of the inner portion 15 may preferably be two times or more the length L2 of the outer portion 16. On the other hand, when the length L1 of the inner portion 15 is too long as compared with the length L2 of the outer portion 16, lateral rigidity of a portion adjacent to the outer portion 16 of the middle block 9 may be lowered. Thus, the length L1 of the inner portion 15 may preferably be three times or less the length L2 of the outer portion 16.

Each middle lateral groove 8, in this embodiment, the apex 8A is located inwardly in the tire axial direction with respect to the innermost edge 14i in the tire axial direction of the axially innermost arranged dimple 14. That is, the plurality of dimples 14 is arranged within an axial region B which corresponds to the outer portion 16. Thus, reduction in rigidity of an axially inner portion of the middle block 9 adjacent to the inner portion 15 may be suppressed, thereby maintaining better steering stability.

In order to generate large snow-shearing force, each middle lateral groove 8 may preferably have a width W2 equal to or more than 90% of the width W1 of the shoulder main groove 3. Further, in order to suppress reduction in pattern rigidity of the middle land portion 5, the width W2 of each middle lateral groove 8 may preferably be equal to or less than 110% of the width W1 of shoulder main groove 3. Furthermore, each middle lateral groove 8 may preferably have a depth in a range of from 6.0 to 9.0 mm.

The ground contacting surface 12a of the second portion 12 includes a circumferential edge 13e, and a lateral edge 17e along the middle lateral groove 8 which is located on an opposite direction in the tire circumferential direction to the recess 10. In this embodiment, the circumferential edge 13e intersects the lateral edge 17e at an acute angle θ. Thus, since a corner 12B of the second portion 12 formed between the circumferential edge 13e and the lateral edge 17e tends to deform flexibly, the outer portion 16 of the middle lateral groove 8 may hold snow effectively as well as release smoothly.

In order to further improve the above effects, the angle θ between the circumferential edge 13e and the lateral edge 17e may preferably be equal to or less than 85 degrees. Further, in order to further improve steering stability on dry road condition, the angle θ may preferably be equal to or more than 60 degrees.

In order to improve driving performance on snow road conditions and steering stability on dry road condition in a well-balanced manner, a length L3 of the circumferential edge 13e of the second portion 12 may preferably be in a range of from 50% to 80% of the length L4 of the circumferential edge 13i of the first portion 11e.

The recess 10 may be inclined with respect to the tire axial direction from the shoulder main groove 3 toward the first side. Thus, reduction in ground contacting area of the second portion 12 may be suppressed, leading to better steering stability.

The recess 10 is inclined in the same direction as the outer portion 16 with respect to the tire axial direction. That is, recess 10 is inclined in a direction such that the recess 10 is away from the dimple 14. Thus, reduction in rigidity in the tire circumferential direction of a portion between the recess 10 and the outer portion 16 of the second portion 12 may be suppressed.

In this embodiment, an inner end 10i of the recess 10 in the tire axial direction is located outwardly in the tire axial direction of the innermost edge 14i in the tire axial direction of the axially innermost arranged dimple 14. This configuration may be useful to increase the above effects. Preferably, the recess 10 may have a length L5 in the tire axial direction in a range of from 50% to 85% of the length L2 in the tire axial direction of the outer portion 16.

The recess 10, in this embodiment, has a width which gradually decreases inwardly in the tire axial direction, thereby maintaining pattern rigidity of the middle land portion 5. Preferably, the recess 10 may have a depth in a range of from 5.5 to 8.5 mm.

Figure 3:
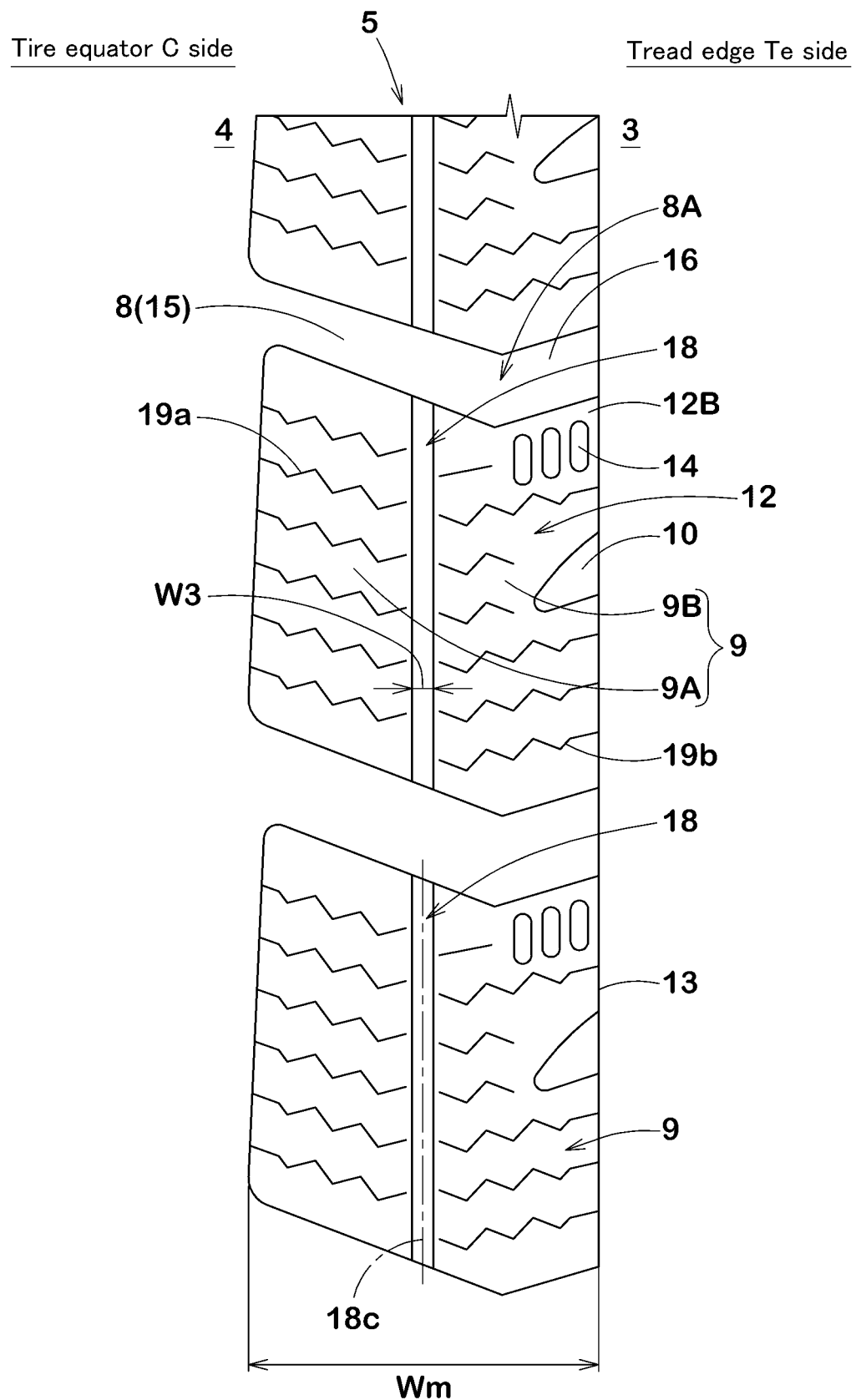

FIG. 3 illustrates an enlarged view of the middle land portion 5 which is located on the rights side of FIG. 1. As illustrated in FIG. 3, each of the middle blocks 9 is provided with a narrow groove 18. In this embodiment, the narrow groove 18 extends in the tire circumferential direction with a width and a depth which are smaller than those of the shoulder main groove 3. The narrow groove 18 may promote deforming the middle block 9, in particular, the second portion 12 provided with the dimple 14. Thus, snow held in the middle lateral grooves 8 may be released smoothly.

In this embodiment, each narrow groove 18 has both ends each of which is in communication with one middle lateral groove 8 at a position located inwardly in the tire axial direction of the apex 8A of the middle lateral groove 8. Thus, since a V-shaped snow column may be formed in a region of each middle lateral groove 8 existing outwardly in the tire axial direction of the narrow groove 18, driving performance on snow road condition can be improved. In order to generate large snow-shearing force effectively using the apex 8A, the groove centerline 18c of each narrow groove 18 may be located away at an axial distance equal to or more than 40% of the maximum width Wm of the middle block 9 from the circumferential edge 13. Further, in order to ensure sufficient flexibility of the second portion 12, the groove centerline 18c may be located away at an axial distance equal to or less than 60% of the maximum width Wm of the middle block 9 from the circumferential edge 13.

In this embodiment, each narrow groove 18 divides each middle block 9 into an inner block portion 9A and an outer block portion 9B. The inner block portion 9A is disposed between the crown main groove 4 and the narrow groove 18. The outer block portion 9B is disposed between the narrow groove 18 and the shoulder main groove 3.

The narrow groove 18, in this embodiment, extends in a straight manner in the tire circumferential direction (e.g. in parallel with the tire circumferential direction). The narrow groove 18 as such may suppress excessive reduction in circumferential rigidity of the middle block 9 leading to better steering stability on dry road condition.

Preferably, the narrow groove 18 may have a width W3 in a range of from 2.0 to 5.5 mm and a depth in a range of from 1.5 to 3.5 mm.

In this embodiment, each inner block portion 9A is provided with at least one, preferably a plurality of inner sipes 19a. The inner sipes 19a are inclined in the same direction as the inner portions 15 of the middle lateral grooves 8. The inner sipes 19a as such may suppress excessive reduction in rigidity of each inner block portion 9A.

In this embodiment, each outer block portion 9B is provided with at least one, preferably a plurality of outer sipes 19b. The outer sipes 19b are inclined in the same direction as the recess 10. The outer sipes 19b as such may suppress excessive reduction in rigidity of each outer block portion 9B.

It is not particularly limited, but the inner sipes 19a and the outer sipes 19b may have depths in a range of from 4.0 to 8.0 mm, for example.

Figure 4:
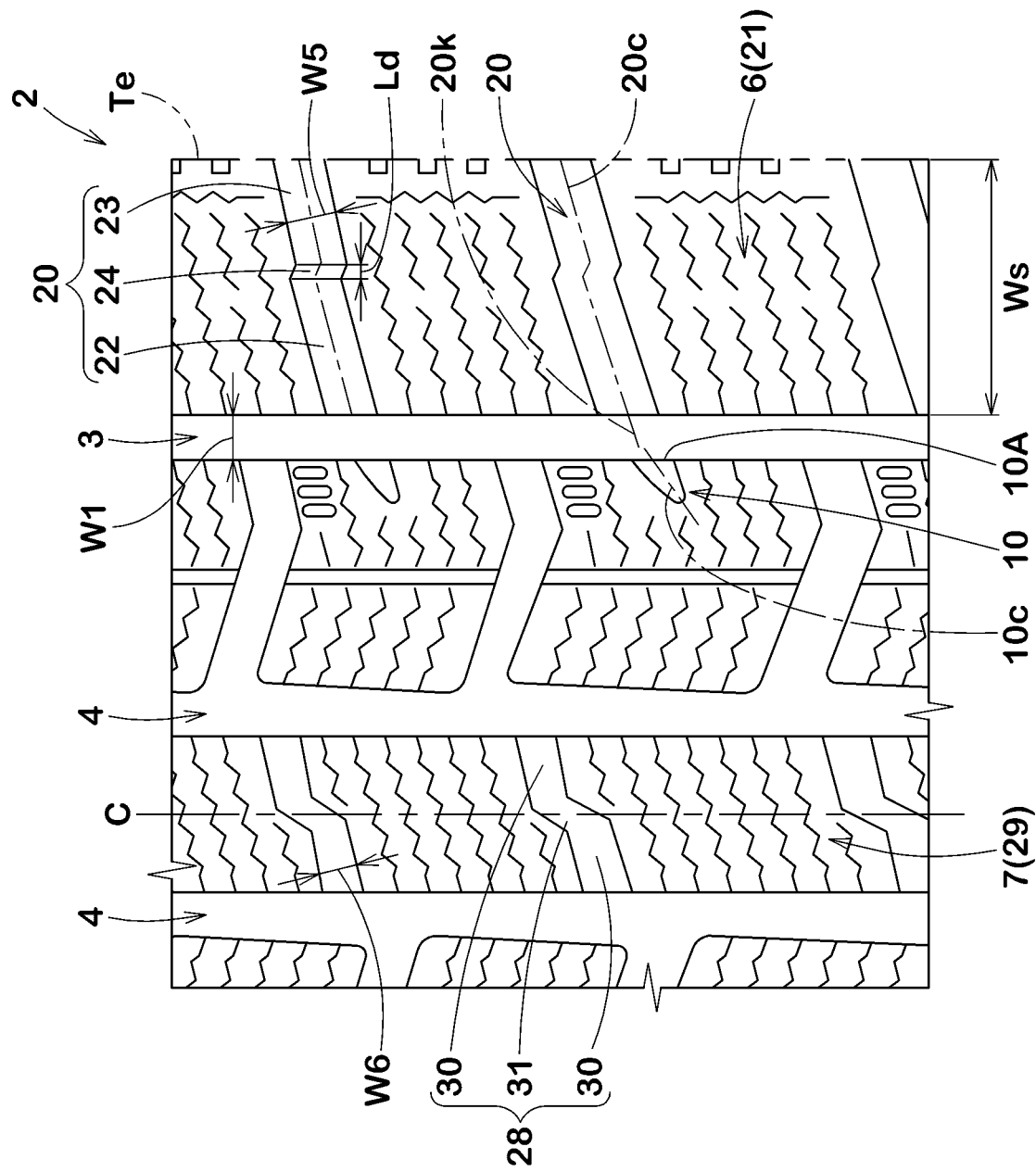
FIG. 4 is an enlarged view of the right side of the tread portion of FIG. 1.

FIG. 4 illustrates an enlarged view of the right side of the tread portion 2 of FIG. 1. As illustrated in FIG. 4, the shoulder land portion 6 may be provided with at least one, preferably a plurality of shoulder lateral grooves 20 each extending from the shoulder main groove 3 to the tread edge Te. The shoulder land portion 6 thus is divided into a plurality of shoulder blocks 21 by the shoulder main groove 3, the tread edge Te and the shoulder lateral grooves 20.

In some preferred embodiments, each shoulder lateral groove 20 may be arranged so as to be continuous smoothly to the recess 10 in such a manner as to form a single groove across the shoulder main groove 3. Thus, a longer snow column in the tire axial direction may be formed by a combination of the shoulder lateral groove 20 and the recess 10, leading to improved driving performance on snow road condition. As used herein, "to form a single groove" means not only an aspect that a virtual extension line 20k of the groove centerline 20c of the concerned shoulder lateral groove 20 overlaps the centerline 10c of the concerned recess 10, but also an aspect that the virtual extension line 20k passes the opening 10A of recess 10.

The shoulder lateral grooves 20 each include a shoulder inner portion 22, a shoulder outer portion 23 and a shoulder connecting portion 24. The shoulder inner portion 22 extends outwardly in the tire axial direction from the shoulder main groove 3 at an inclination with respect to the tire axial direction. The shoulder outer portion 23 extends inwardly from the tread edge Te at an inclination same as the shoulder inner portion 22. The shoulder connecting portion 24 connects the shoulder inner portion 22 with the shoulder outer portion 23 with an inclination in an opposite direction to the shoulder inner portion 22. The shoulder lateral groove 20 as such may promote deformation of a portion of the shoulder block 21 which adjacent to the shoulder connecting portion 24, thereby releasing effectively snow in the shoulder lateral groove 20.

In order to further improve the above effect, at least one shoulder connecting portion 24 may preferably have a length Ld in the tire axial direction equal to or more than 2% of the maximum width Ws of the shoulder land portion 6, but preferably equal to or less than 8% of the maximum width Ws of the shoulder land portion 6. Further, at least one shoulder connecting portion 24 may be arranged at a location away from the tread edge Te at a distance in a range of from 25% to 65% of the maximum width Ws of the shoulder land portion 6.

Preferably, the shoulder lateral grooves 20 have widths W5 greater than the width W1 of the shoulder main groove 3 in order to improve driving performance on snow road condition, for example. In order to improve circumferential rigidity of the shoulder blocks 21, the widths W5 of the shoulder lateral grooves 20 may preferably be in a range of from 1.1 to 1.5 times the width W1 of the shoulder main groove 3. Preferably, the shoulder lateral grooves 20 may have depths in a range of from 6.5 to 9.5 mm.

The crown land portion 7, in this embodiment, is divided into a plurality of crown blocks 29 by a plurality of crown lateral grooves 28 each of which traverses completely the crown land portion 7.

Each crown lateral groove 28, in this embodiment, is inclined with respect to the tire axial direction so that the crown lateral groove 28 may compress a longer snow column on snow road, leading to better driving performance on snow road condition.

Each crown lateral groove 28 includes a pair of crown outer portions 30 and a crown connecting portion 31. Each of the crown outer portions 30, in this embodiment, extends from the respective crown main groove 4 toward the tire equator C, and terminates within the crown land portion 7. The crown connecting portion 31, in this embodiment, connects the pair of crown outer portions 30.

Each crown lateral groove 28 has a width W6 which increases gradually outwardly in the tire axial direction in each side of the tire equator C. This configuration may be useful to release snow in the crown lateral groove 28 to the respective crown main groove 4. Preferably, the crown lateral grooves 28 each may have an average width W6 in a range of from 90% to 110% of the width W1 of the shoulder main groove 3. Preferably, the crown lateral grooves 28 each may have a depth in a range of from 6.0 to 9.0 mm.

In each crown lateral groove 28, the crown connecting portion 31 is inclined at an angle which is greater than that of the crown outer portions 30 with respect to the tire axial direction. Thus, the crown blocks 29 may deform flexibly at a boundary between the crown connecting portion 31 and the crown outer portions 30 upon grounding so as to release snow compressed in the crown lateral grooves 28 easily.

In order to improve driving performance on snow road condition while maintaining steering stability on dry road condition, the tread portion 2 may preferably have a land ratio in a range of from 60% to 75%. As used herein, the land ratio is defined as a ratio of a total actual ground contact area to a total gross ground contact area, wherein the total gross ground contact area is sum of areas of the grooves, the sipes and the total actual ground contact area, between the tread edges Te.

While the particularly preferable embodiments in accordance with the present disclosure have been described in detail, the present invention is not limited to the illustrated embodiments, but can be modified and carried out in various aspects.

EXAMPLE

Test tires 195/65R16 having the basic tread pattern as illustrated in FIG. 1 were manufactured based on the details shown in Table 1. Then, driving performance on snow road condition and steering stability on dry road condition were tested. The test procedures are as follows.

Test for Driving Performance on Snow Road Condition and Steering Stability on Dry Road Condition:

The test tires were mounted on a passenger car with a displacement of 1600 cc on its all wheels under the following condition. Then, a test driver drove the respective test courses of dry road condition and snow road condition to evaluate driving performance such as traction property, steering response and cornering performance by his sense. The test results are shown in Table 1 using a score wherein the Ref. is set to 100. The larger the score, the better the performance is.

Rim size (all wheels): 15×6.0
Tire inner pressure (all wheels): 210 kPa
Depths of the main grooves: 9.0 mm
Depths of the middle lateral grooves: 7.0 mm
Depths of the shoulder lateral grooves: 7.5 mm
Depths of the crown lateral grooves: 7.0 mm
Depths of the inner sipes: 7.0 mm
Depths of the outer sipes: 5.0 mm
Table 1 shows the test results.

As apparent from the test results as shown in Table 1, it is confirmed that the example tires improve driving performance on snow road condition while maintaining steering stability on dry road condition as compared with the reference example tire. It has been confirmed that other tests conducted while changing tire sizes showed similar results.

What is claimed is:

1. A tire comprising:
a tread portion being provided with a shoulder main groove extending continuously in a tire circumferential direction on a side of a tread edge and a crown main groove extending continuously in the tire circumferential direction and arranged inwardly in a tire axial direction of the shoulder main groove to form a middle land portion between the shoulder main groove and the crown main groove;
the middle land portion divided into a plurality of middle blocks by a plurality of middle lateral grooves connecting the shoulder main groove with the crown main groove;
at least one of the plurality of middle blocks being provided with a recess extending inwardly in the tire axial direction from the shoulder main groove and terminated within the at least one of the middle blocks so as to form a first portion located on a first side in the tire circumferential direction of the recess and a second portion located on a second side in the tire circumferential direction of the recess, wherein at a side of the shoulder main groove, the second portion has a circumferential edge smaller than that of the first portion; and
the second portion comprising a ground contacting surface provided with at least one dimple, the at least one dimple located on a side of the shoulder main groove with respect to the center in the tire axial direction of the middle land portion, wherein
each of the plurality of middle lateral grooves has a V-shaped manner having an apex protruding toward the first side in the tire circumferential direction,
the plurality of middle lateral grooves each includes an inner portion and an outer portion, the inner portion

TABLE 1

|  | Ref. 1 | Ref. 2 | Ref. 3 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- | --- |
| Relation of edge lengths L3 and L4 | L3 < L4 | L4 < L3 | L3 < L4 | L3 < L4 | L3 < L4 | L3 < L4 | L3 < L4 | L3 < L4 | L3 < L4 | L3 < L4 | L3 < L4 |
| Dimples | none | presence | presence | presence | presence | presence | presence | presence | presence | presence | presence |
| Recesses | presence | presence | none | presence | presence | presence | presence | presence | presence | presence | presence |
| Angle θ (deg.) | 70 | 70 | 70 | 70 | 60 | 70 | 70 | 70 | 55 | 60 | 85 |
| Length La in major axis of dimples (mm) | — | 3.5 | 3.5 | 3.5 | 3.5 | 3 | 4.5 | 3.5 | 3.5 | 3.5 | 3.5 |
| Length Lb in minor axis of dimples (mm) | — | 1.5 | 1.5 | 1.5 | 1.5 | 1 | 2.5 | 1.5 | 1.5 | 1.5 | 1.5 |
| Depths of dimples (mm) | — | 2.0 | 2.0 | 2.0 | 2.0 | 0.5 | 3.0 | 2.0 | 2.0 | 2.0 | 2.0 |
| Widths W3 of narrow grooves (mm) | 2.5 | 2.5 | 2.5 | 2.5 | 2.5 | 2.5 | 2.5 | 1.5 | 3.5 | 2.5 | 2.5 |
| Depths of narrow grooves (mm) | 3.5 | 3.5 | 3.5 | 3.5 | 3.5 | 3.5 | 3.5 | 2 | 5.5 | 3.5 | 3.5 |
| Inclination direction of recesses from shoulder main groove | — | away from dimples | — | away from dimples | away from dimples | away from dimples | away from dimples | away from dimples | away from dimples | toward dimples | away from dimples |
| Directions of recesses and sipes | same | same | — | same | same | same | same | same | same | same | reverse |
| Driving performance on snow road condition [score] | 85 | 92 | 88 | 100 | 101 | 95 | 97 | 98 | 102 | 98 | 97 |
| Steering stability on dry road condition [score] | 97 | 98 | 97 | 100 | 97 | 102 | 98 | 101 | 96 | 97 | 98 | extending from the apex toward a tire equator with an inclination with respect to the tire axial direction, the outer portion extending outwardly in the tire axial direction from the apex with an inclination with respect to the tire axial direction in an opposite direction to the inner portion, and the recess has a length $L5$ in the tire axial direction in a range of 50% to 85% of a length $L2$ in the tire axial direction of the outer portion.

2. The tire according to claim 1, wherein the tread portion further comprises a shoulder land portion disposed between the shoulder main groove and the tread edge, the shoulder land portion is provided with at least one shoulder lateral groove extending from the shoulder main groove to the tread edge, and the at least one shoulder lateral groove is arranged so as to be continuous smoothly to at least one recess in such a manner as to form a single groove across the shoulder main groove.

3. The tire according to claim 1, wherein the ground contacting surface of the second portion comprises a lateral edge on an opposite side in the tire circumferential direction to the recess, and the lateral edge intersects the circumferential edge of the second portion at an acute angle.

4. The tire according to claim 1, wherein the recess is inclined toward the first side in the tire circumferential direction from the shoulder main groove.

5. The tire according to claim 1, wherein a length $L3$ of the circumferential edge of the second portion is in a range of 50% to 80% of a length $L4$ of the circumferential edge of the first portion.

6. The tire according to claim 1, wherein at least one of the plurality of middle blocks is provided with a narrow groove extending in the tire circumferential direction and having a width and a depth which are smaller than those of the shoulder main groove, and the narrow groove is in communication with at least one of the plurality of middle lateral grooves at a position located inwardly in the tire axial direction of the apex of the at least one of the plurality of middle lateral grooves.

7. The tire according to claim 6, wherein a groove centerline of the narrow groove is located away from the circumferential edge at an axial distance in a range of from 40% to 60% of a maximum width $Wm$ of the middle block.

8. The tire according to claim 7, wherein a length $L3$ of the circumferential edge of the second portion is in a range of 50% to 80% of a length $L4$ of the circumferential edge of the first portion.

* * * * *